United States Patent [19]
Eyre

[11] Patent Number: 5,887,580
[45] Date of Patent: Mar. 30, 1999

[54] CUTTING ELEMENT WITH INTERLOCKING FEATURE

[75] Inventor: Ronald K. Eyre, Orem, Utah

[73] Assignee: Smith International, Inc., Houston, Tex.

[21] Appl. No.: 47,800

[22] Filed: Mar. 25, 1998

[51] Int. Cl.$^6$ ........................................................ B28D 5/04
[52] U.S. Cl. ........................... 125/36; 451/540; 175/428
[58] Field of Search ........................ 125/36, 39; 451/540, 451/541, 542; 175/428, 432; 51/307, 309

[56] References Cited

U.S. PATENT DOCUMENTS

| | | |
|---|---|---|
| 4,629,373 | 12/1986 | Hall . |
| 4,861,350 | 8/1989 | Phaal et al. . |
| 5,120,327 | 6/1992 | Dennis . |
| 5,379,854 | 1/1995 | Dennis . |
| 5,605,199 | 2/1997 | Newton . |

*Primary Examiner*—David A. Scherbel
*Assistant Examiner*—Derris Holt Banks
*Attorney, Agent, or Firm*—Christine, Parker & Hale, LLP

[57] ABSTRACT

A cutting element having a body which includes a grip portion from which extends a protrusion which is concentric to the grip portion. The diameter of the grip portion is larger than the diameter of the protrusion. Moreover, the upper portion of the protrusion has a larger diameter than the base of the protrusion. An ultra hard material cutting layer is formed on top of the protrusion and grip, covering and surrounding the protrusion resulting in a cutting layer that is mechanically interlocked with the body of the cutting element. A transition layer may be incorporated between the protrusion and the ultra hard material layer. The transition layer is preferably encapsulated by the ultra hard material layer.

26 Claims, 2 Drawing Sheets

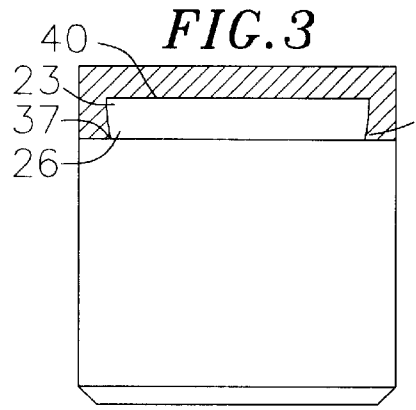
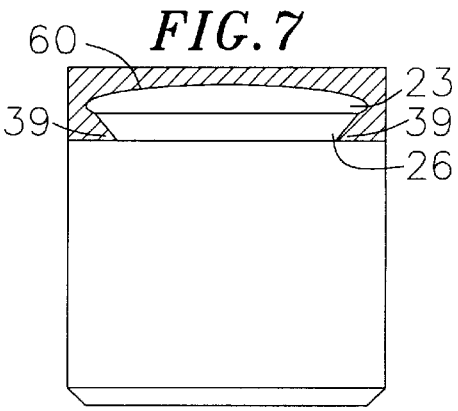
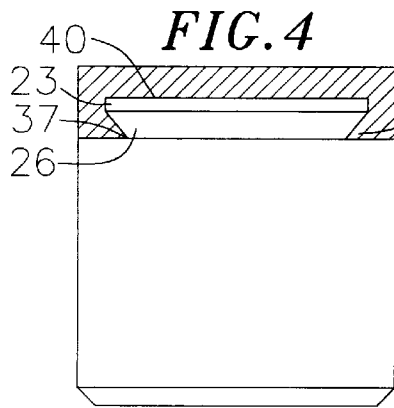
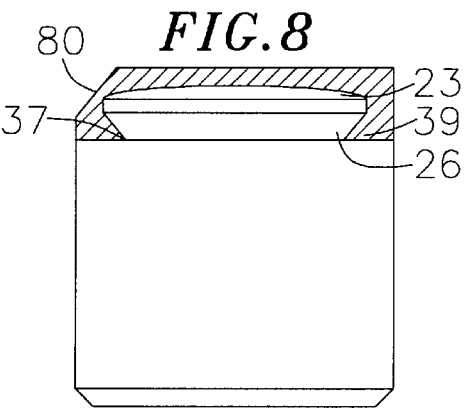
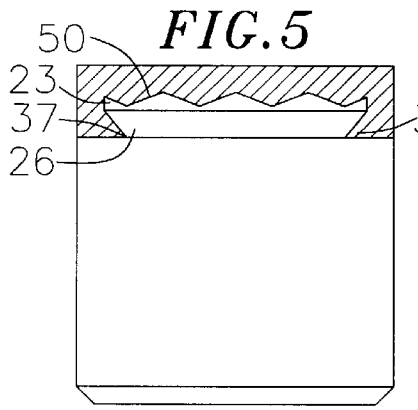
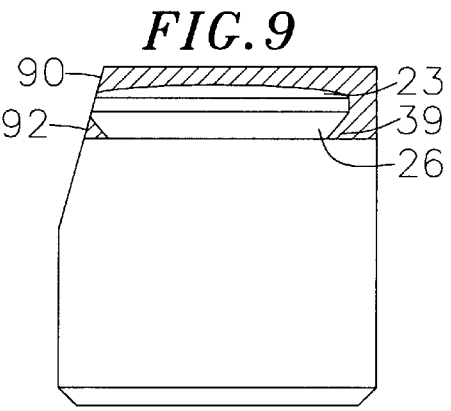
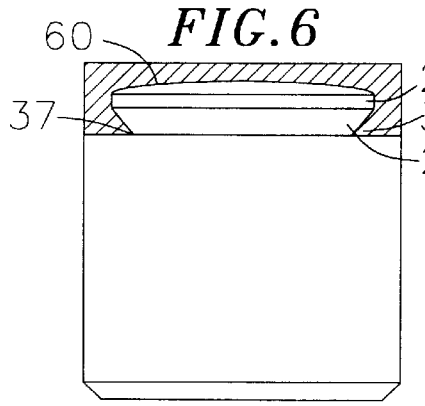
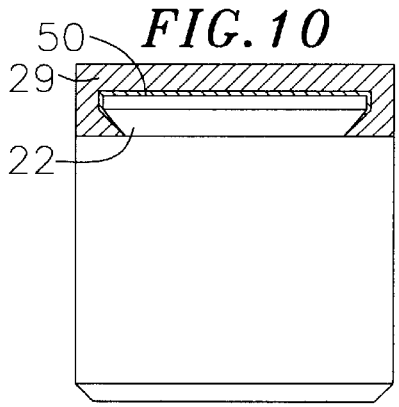

ation of the ultra hard material is required.

CUTTING ELEMENT WITH INTERLOCKING FEATURE

BACKGROUND OF THE INVENTION

This invention relates to cutting elements for use in a rock bit and more specifically to cutting elements having an interlocking feature for interlocking the cutting element cutting table with the cutting element substrate.

A cutting element, such as a shear cutter shown in FIG. 1, typically has a cylindrical cemented tungsten carbide substrate body 10. An ultra hard material cutting table (i.e., layer) 12 is bonded onto the substrate by a sintering process. The cutting table has a planar, typically flat upper surface 14. During the sintering process, cobalt from the tungsten carbide substrate mixes with the ultra hard material forming a polycrystalline structure. A depletion in the amount of cobalt mixing with the ultra hard material may result in a more brittle polycrystalline structure or may even prevent the formation of a polycrystalline structure.

Common problems that plague cutting elements and specifically cutting elements having an ultra hard cutting table, such as polycrystalline diamond (PCD) or polycrystalline cubic boron nitride (PCBN) bonded on a cemented carbide substrate, are chipping, spalling, partial fracturing, cracking or exfoliation of the cutting table. These problems result in the early failure of the cutting table and thus, in a shorter operating life for the cutting element. Typically, these problems may be the result of peak (high magnitude) stresses generated on the ultra hard layer at the region in which the cutting layer makes contact with the earthen formation during drilling. Generally, the cutting elements are inserted into a drag bit body at a rake angle. Consequently, the region of the cutting element that makes contact with the earthen formation includes a portion of the ultra hard material layer upper surface circumferential edge 15. These portions of the layers are subjected to the highest impact loads.

One way to attempt to overcome these problems is to increase the thickness of the ultra hard material. Theoretically, an increase in the ultra hard material layer results in increased cutting element impact and wear resistance. However, an increase in the thickness of the ultra hard material layer may result in delamination of the ultra hard material layer from the substrate. Moreover, as the ultra hard material layer thickness increases, the edges and surfaces of the ultra hard material furthest away from the substrate (e.g., the ultra hard material layer upper surface circumferential edge) are starved for cobalt during the sintering process. Consequently, the strength and ductility of these edges is decreased. Thus, the ultra hard material edges subjected the highest impact loads will be brittle and have lower impact and wear resistance resulting in the early failure of the cutting layer.

Another problem associated with increasing the thickness of the ultra hard material layer is that as the ultra hard material volume increases there is an increase in the residual stresses formed on the ultra hard material due to the thermal coefficient mismatch between the ultra hard material layer and the substrate. The cemented carbide substrate has a higher coefficient of thermal expansion than the ultra hard material. During sintering, both the cemented carbide body and ultra hard material layer are heated to elevated temperatures expanding and forming a bond between the ultra hard material layer and the cemented carbide substrate. The heating causes the substrate to expand more than the ultra hard material. As the ultra hard material layer and substrate cool down, the substrate shrinks more than the ultra hard material because of its higher coefficient of thermal expansion. Consequently, thermally induced tensile stresses are formed on the ultra hard material layer and compressive stresses are formed on the substrate.

Furthermore, an increase in the volume of the ultra hard material also results in the buildup of residual stresses on the ultra hard material layer/substrate interface due to the difference in shrinkage between the ultra hard material and the substrate caused by the consolidation of the ultra hard material and the consolidation of the substrate after sintering. The amount of ultra hard material shrinkage is proportional to the relative volume of the ultra hard material to the substrate. If the difference between the volumes of the ultra hard material and the substrate are significant enough, the shrinkage of the ultra hard material due to consolidation may be great enough to generate tensile residual stresses on the ultra hard material layer and compressive residual stresses on the substrate.

Accordingly, there is a need for a cutting element having an ultra hard material table with improved impact and wear resistance as well as increased cracking, chipping, fracturing, and exfoliating characteristics, and thereby an enhanced operating life.

SUMMARY OF THE INVENTION

This invention is directed to cutting elements having a substrate body which consists of a grip portion from which extends a protrusion. The protrusion, which is concentric to the grip, has a diameter which is smaller than the diameter of the grip. Stated differently, the periphery of the grip extends beyond the periphery of the protrusion. The protrusion has a base which interfaces with the grip and an upper surface. The diameter of the upper surface is greater than the diameter of the base. An ultra hard material layer is formed on top of the protrusion and grip, covering and surrounding the protrusion as well as the portion of the grip extending beyond the protrusion. As a result, the ultra hard material layer has an annular edge portion which surrounds the protrusion. This annular edge portion is longitudinally thicker than the portion of the ultra hard material layer immediately above the protrusion. Moreover, the radial thickness of the annular edge is greater near the base of the protrusion than it is near the upper surface of the protrusion. Consequently, the ultra hard material layer is "mechanically" interlocked with the body (i.e., the substrate) of the cutting element. By surrounding the protrusion with an ultra hard material layer, the outer surfaces of the ultra hard material layer remain close enough to the cobalt source (i.e., the protrusion) thereby ensuring that these surfaces will not be starved for cobalt during the sintering process. A transition layer having properties intermediate between the properties of the protrusion and the ultra hard material layer may be incorporated between the protrusion and the ultra hard material layer.

BRIEF DESCRIPTION OF THE DRAWINGS

FIGS. 3 and 4 are partial side views of a cutting element having a protrusion having a flat upper surface.

FIG. 5 is a partial side view of a cutting element having a protrusion having a serrated upper surface.

FIGS. 6 and 7 are partial side views of cutting elements having a protrusion having a convex upper surface.

FIG. 8 is a partial side view of a cutting element of the present invention with a portion of the ultra hard material layer worn off.

FIG. 9 is a partial side view of a cutting element of the present invention with a portion of the cutting layer worn off such that it exposes a portion of the protrusion forming a twin cutting edge.

FIG. 10 is a partial side view of a cutting element of the present invention having a transition layer between the protrusion and the ultra hard material layer that is encapsulated by the ultra hard material layer.

DETAILED DESCRIPTION

Figure 1:
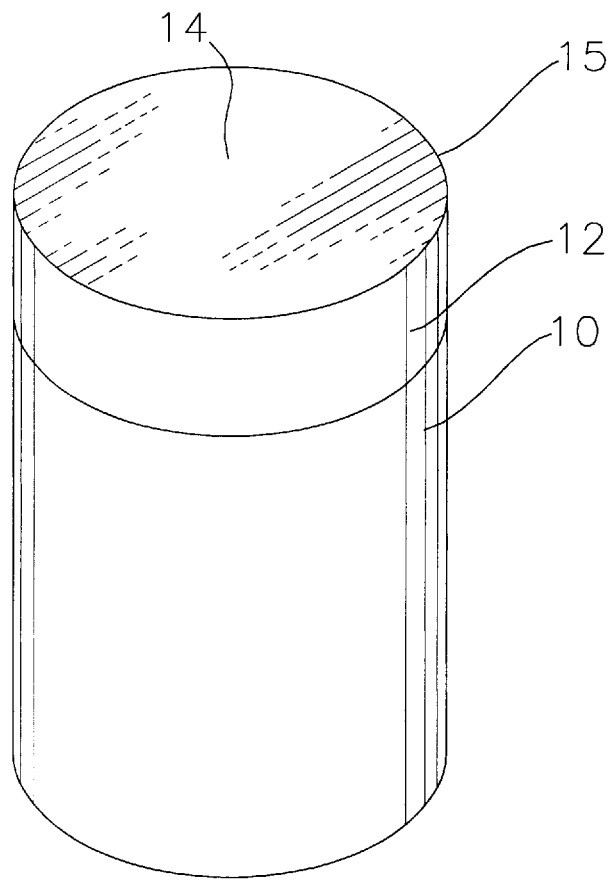
FIG. 1 is a perspective view of a typical prior art shear cutter.

The present invention is directed to cutting elements. Cutting elements such as shear cutters typically comprise a carbide body 10 onto which is bonded an ultra hard material layer 12 (FIG. 1). The ultra hard material layer is typically polycrystalline diamond (PCD) or polycrystalline cubic boron nitride (PCBN).

The ability of ultra hard material to resist chipping, i.e., its chipping resistance is increased with an increase in the ultra hard material thickness. Applicants have theorized that chipping is a function of the material's ability to absorb energy, i.e., energy generated by impact. The thicker, or rather, the more voluminous the ultra hard material table, the more energy it will be able to absorb and the greater chip resistance that it will have. On the other hand, as the volume of the ultra hard material table increases, the risk that the ultra hard material table will delaminate from the substrate or exfoliate increases. Moreover, as the ultra hard material gets thicker, the areas of the ultra hard material table furthest away from the substrate, such as the circumferential edge 15 of the ultra hard material table, are starved of cobalt during the ultra hard material sintering process. Consequently those areas of the ultra hard material table become brittle and have decreased impact and wear resistance.

Figure 2:
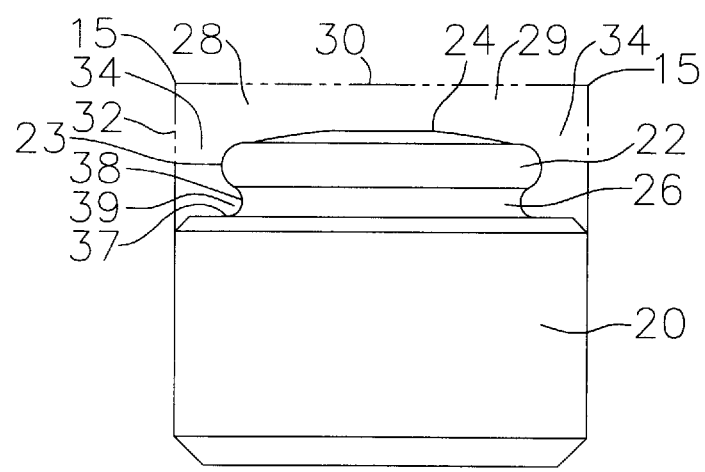
FIG. 2 is a side view of a cutting element of the present invention having a protrusion which has a tiered upper surface and which has a groove formed surrounding the base of the protrusion which interfaces with the grip.

Cutting elements are typically mounted on a bit body at a rake angle. Consequently, the inserts contact the earth formations during drilling along the circumferential edges 15 of their ultra hard material table upper surfaces. In order to improve the operating lives of the cutting elements, the present invention provides for cutting table having a thicker edge for contacting the earth formation during drilling without sacrificing the impact and wear resistance of the cutting table. To accomplish this, the cutting element has a body which includes a grip 20 from which extends a protrusion 22 (FIG. 2). The protrusion is concentric to the grip. The protrusion has an upper portion 23, an upper surface 24 and a base 26. The diameter of the protrusion upper portion is smaller than the outer diameter of the grip. The base of the protrusion has a diameter which is smaller than the maximum diameter of the upper portion. A ultra hard material layer 29 is formed on top of the grip completely encasing the protrusion. The ultra hard material layer typically has a flat upper surface 30 and a cylindrical circumferential surface 32 forming a circular edge 15 at its intersection with the ultra hard material upper surface. Consequently, an annular edge portion 34 of the ultra hard material layer is formed surrounding the protrusion which is longitudinally thicker than the portion of the ultra hard material layer immediately above the protrusion. In one embodiment, the annular edge portion of the ultra hard material layer has a thickness that is at least twice the layer thickness directly above the protrusion upper surface. The radial thickness of the annular edge is greater at the base of the protrusion than it is at the upper portion of the protrusion. As a result, a portion 39 of the ultra hard material layer is sandwiched between the protrusion upper portion and the grip "mechanically" interlocking the ultra hard material layer to the body of the cutting element.

By surrounding the above described protrusion with a ultra hard material layer, the outer surfaces of the ultra hard material layer remain close enough to the cobalt source, (i.e., the protrusion) thereby preventing the ultra hard material outer surfaces from starving for cobalt during the sintering process. Preferably, the shortest distance between any point on the ultra hard material layer and the substrate is no greater than 0.13 inch. As a result, the inventive cutting elements have a thicker cutting layer edge than do conventional cutting elements which is not starved for cobalt during the sintering process. Consequently, the cutting table edges of the inventive cutting elements have superior impact and wear resistance than the edges of conventional cutting element cutting tables.

Wear resistance is improved because as the ultra hard material layer wears diagonally along the edge 15, a greater amount of ultra hard material 80 is exposed which must be worn off if wear were to progress (FIG. 8). Moreover, the increased thickness provides for increased impact resistance along the edge. Furthermore, when the ultra hard material layer wears enough so as to expose part of the protrusion, a twin cutting edge 90, 92 is formed on the ultra hard material table which results in an increased cutting efficiency (FIG. 9).

With the present invention, the volume of ultra hard material is increased due to the increased thickness of the cutting table annular edge portion. The volume of the carbide substrate is increased by the addition of the protrusion. Thus, the relative volume of ultra hard material to substrate is not significantly altered. As a result, the increase in the ultra hard material volume does not generate any significant residual stresses which would adversely effect the delamination resistance of the ultra hard material layer from the substrate. Resistance to delamination is further enhanced due to the interlocking of the ultra hard material layer to the carbide body.

The present invention also reduces the risk of delamination of the cutting element cutting layer by reducing the magnitude of shear stresses at the cutting layer/body interface. With conventional shear cutters, for example, the component of the impact/cutting load generated during drilling which is parallel to the face of the cutting layer is reacted as a shear stress along the interface between the body of the cutting element and the cutting layer. This shear stress tends to promote the delamination of the cutting layer from the body. With the present invention, a portion of this load component is reacted as a radial stress on the protrusion. Consequently, less load is reacted in shear at the protrusion/cutting layer interface thus, further reducing the risk of cutting layer delamination.

Conventional cutting elements are limited to ultra hard material layers having a maximum edge thickness of 0.1 inch so as to ensure that the edges of the of such layers are not starved for cobalt during the sintering process and to minimize the ultra hard material residual stresses and the risk for delamination. With the present invention, applicants have discovered that the can have a layer edge thickness of at least 0.18 inch (typically between 0.2 and 0.3 inch) without increasing the residual stresses or the risk of delamination. Moreover, tests conducted by the applicants revealed that the impact strength at the edge of the ultra hard material layer for the inventive cutting elements is twice that of conventional cutting elements.

Further embodiments of the present invention are shown in FIGS. 3–7. In the embodiment shown in FIGS. 3 and 4 the protrusion has a flat upper surface 40. In the embodiment shown in FIG. 5, the protrusion has a serrated upper surface 50. The serrated upper surface tends to reduce the effects of the abrupt shift in the coefficient of thermal expansion between the ultra hard material and the carbide. With this embodiment, the serrated interface allows for a gradual shift in the coefficient of thermal expansion from the substrate to the ultra hard material table by providing a section between the ultra hard material and the tungsten carbide substrate that includes both ultra hard material and tungsten carbide. As a result, the magnitude of the residual stresses on the ultra hard material cutting table are reduced. Another advantage of the serrations is that they provide for more surface area for the bonding of the ultra hard material layer to the substrate. The increase in the bonding surface area decreases the risk of delamination.

In the embodiments shown in FIGS. 6 and 7, the uppers surfaces 60 of the protrusion are convex. The upper convex surface of the embodiment shown in FIG. 6 has a greater radius of the curvature than that of the embodiment shown in FIG. 7. Use of a convex surface also provides for an increase in the surface area for bonding between the carbide protrusion and the ultra hard material layer thus reducing the risk of ultra hard material layer delamination.

In yet a further a embodiment, as shown in FIG. 2, the upper surface 30 of the protrusion is tiered. In other embodiments, the differential in outer diameter between the upper portion and the base portion of the protrusion is varied. In all embodiments, it is preferred that all the comers formed on the protrusion are rounded. For example, the circular edge 37 of intersection between the protrusion and grip has a radius of curvature. In a preferred embodiment shown in FIG. 2, an annular groove 38 is formed at the base of the protrusion. Similarly, it is preferable that the outer surfaces of the protrusion have intersections which form radii of curvature.

With all of the embodiments described above, one or multiple transition layers of a material having properties intermediate to the properties between the protrusion and ultra hard material layer may be formed between the cutting element body and the ultra hard material layer 29. By having intermediate properties, a transition layer reduces the magnitude of the residual stresses that are formed at the interface between the ultra hard material layer and the cutting element body. Preferably, the transition layer(s) 50 is formed only over the protrusion 22 as shown in FIG. 10. In this regard, the transition layer(s) is encapsulated by the ultra hard material layer. By encapsulating the transition layer, the transition layer is not exposed to the earth formations being drilled and thus, is not directly exposed to the impact loads. An exposed transition layer can become a crack initiation site. By encapsulating the transition layer, the benefits resulting from the transition layer are obtained without the risk of crack initiation that is prevalent when the transition layer is exposed to the earth formations.

I claim:

1. A cutting element comprising:
    a carbide grip portion having a top end having a periphery;
    a carbide protrusion extending from the grip top end, the protrusion having an upper portion having an upper surface and a surrounding surface and a base, wherein at least a portion of the top end extends radially beyond the protrusion to the periphery and wherein the base of the protrusion is narrower than the upper portion of the protrusion; and
    an ultra hard material layer surrounding the protrusion and covering the top end extending beyond the protrusion.

2. A cutting element as recited in claim 1 wherein the grip periphery, and the protrusion upper portion and base are circular.

3. A cutting element as recited in claim 2 wherein the surrounding surface of the protrusion forms an inverted truncated cone.

4. A cutting element as recite in claim 2 wherein an annular space is formed on the top end of the grip surrounding the protrusion which is covered by the ultra hard material layer.

5. A cutting element as recited in claim 1 wherein the protrusion upper surface is flat.

6. A cutting element as recited in claim 1 wherein the protrusion upper surface is non-uniform.

7. A cutting element as recited in claim 6 wherein the protrusion upper surface is serrated.

8. A cutting element as recited in claim 1 wherein the protrusion upper surface is convex.

9. A cutting element as recited in claim 1 wherein an annular groove is formed around the base of the protrusion.

10. A cutting element as recited in claim 1 wherein the thickness of the ultra hard material layer above the top end of the grip portion extending radially beyond the protrusion is at least twice the thickness of the ultra hard material layer directly above the protrusion upper surface.

11. A cutting element as recited in claim 1 wherein the thickness of the ultra hard material layer above the top end of the grip extending beyond the protrusion is at least 0.18 inch.

12. A cutting element as recited in claim 1 wherein the intersection between the protrusion surrounding surface and protrusion upper surface forms a radius of curvature.

13. A cutting element as recited in claim 1 wherein the intersection between the protrusion base and the grip forms a radius of curvature.

14. A cutting element as recited in claim 1 wherein the protrusion upper surface is tiered.

15. A cutting element as recited in claim 1 further comprising a transition layer between the protrusion and the ultra hard material layer.

16. A cutting element as recited in claim 15 wherein the transition layer does not extend to the grip portion periphery.

17. A cutting element comprising:
    a carbide grip portion having a top end having a periphery;
    a carbide protrusion extending from the grip, the protrusion having a base and an upper portion having an upper surface, wherein at least a portion of the protrusion does not extend to the periphery; and
    an ultra hard material layer over the protrusion and covering the top end, the ultra hard material layer having a periphery, wherein the thickness of the ultra hard material layer at its periphery is at least twice the thickness of the ultra hard material immediately above the protrusion, wherein the thickness of the ultra hard material layer at its periphery is least 0.18 inch.

18. A cutting element as recited in claim 17 wherein the thickness of the ultra hard material layer at its periphery is at the range of 0.2 to 0.3 inch.

19. A cutting element as recited in claim 17 wherein the ultra hard material layer mechanically interlocks with the protrusion.

20. A cutting element comprising:
    a carbide grip portion having a top end having a periphery;
    a carbide protrusion extending from the grip, the protrusion having a base and an upper portion having an upper surface, wherein at least a portion of the protrusion does not extend to the periphery;
    an ultra hard material layer over the protrusion and covering the top end, the ultra hard material layer having a periphery, wherein the thickness of the ultra hard material layer at its periphery is at least twice the thickness of the ultra hard material immediately above the protrusion; and
    a transition layer between the protrusion and the ultra hard material layer.

21. A cutting element as recited in claim 20 wherein the transition layer does not extend to the grip portion periphery.

22. A cutting element comprising:
    a carbide grip portion having a top end having a periphery;
    a carbide protrusion extending from the grip, the protrusion having a base and an upper portion having an upper surface, wherein at least a portion of the protrusion does not extend to the periphery; and
    an ultra hard material layer over the protrusion and covering the top end, wherein the thickness of the ultra hard material layer covering the top end is at least 0.18 inch.

23. A cutting element as recited in claim 22 wherein the thickness of the ultra hard material covering the top end is at the of 0.2 inch to 0.3 inch.

24. A cutting element as recited in claim 22 wherein the ultra hard material layer mechanically interlocks with the protrusion.

25. A cutting element comprising:
    a body comprising,
        a carbide grip portion having a periphery, and
        a protrusion extending over the grip portion and defining a annular space with the grip periphery; and
    an ultra hard material layer over the protrusion, the ultra hard material layer having an annular portion within the annular space, the annular portion defining the periphery of the ultra hard material layer, wherein the greatest distance between any point on an outer surface of the ultra hard layer and the body does not exceed 0.13 inch.

26. A cutting element comprising:
    a carbide grip portion having a top end;
    a protrusion extending over the grip top; and
    an ultra hard material layer over the protrusion, the ultra hard material layer having an annular section surrounding the protrusion, wherein a portion of the ultra hard material layer annular section is sandwiched between the protrusion and grip.

* * * * *

UNITED STATES PATENT AND TRADEMARK OFFICE
CERTIFICATE OF CORRECTION

PATENT NO. : 5,887,580
DATED : March 30, 1999
INVENTOR(S) : Ronald K. Eyre

It is certified that error appears in the above-identified patent and that said Letters Patent is hereby corrected as shown below:

Item [56] References Cited, under "U.S. Patent Documents" insert the following references:

| -- | 5,351,772 | 10/1994 | Smith.................175/428 |
|    | 5,435,403 | 7/1995  | Tibbitts...............175/432 |
|    | 5,469,927 | 11/1995 | Griffin.................175/432 |
|    | 5,590,728 | 1/1997  | Matthias et al.........175/432 |
|    | 5,709,279 | 1/1998  | Dennis.................175/432 |
|    | 5,711,702 | 1/1998  | Devlin.................175/432 -- |

<u>Column 1,</u>
Line 50, after "subjected" insert -- to --.

<u>Column 6,</u>
Line 64, replace "is least" with -- is at least --.

<u>Column 8,</u>
Line 3, replace "at the of" with -- at the range of --.

Signed and Sealed this

Twenty-sixth Day of June, 2001

Attest:

NICHOLAS P. GODICI
Attesting Officer      Acting Director of the United States Patent and Trademark Office